(12) United States Patent
Bochove

(10) Patent No.: US 7,796,334 B1
(45) Date of Patent: Sep. 14, 2010

(54) APPARATUS FOR REFLECTING HIGH-INTENSITY ELECTROMAGNETIC RADIATION

(75) Inventor: Erik J. Bochove, Corrales, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 470 days.

(21) Appl. No.: 11/860,717

(22) Filed: Sep. 25, 2007

(51) Int. Cl.
*G02B 1/10* (2006.01)
*H01S 3/08* (2006.01)

(52) U.S. Cl. .................................... 359/584; 372/99
(58) Field of Classification Search ................. 359/584, 359/586, 587, 588; 372/97, 98, 99, 102
See application file for complete search history.

(56) References Cited

U.S. PATENT DOCUMENTS 6,215,592 B1 * 4/2001 Pelekhaty .................... 359/618
6,844,975 B2 * 1/2005 Sargent et al. ............... 359/577

OTHER PUBLICATIONS

P. J. Roberts, F. Couny, H. Sabert, B. J. Mangan, D. P. Williams, L. Farr, M. W. Mason and A. Tomlinson, "Ultimate low loss of hollow-core photonic crystal fibres," *Optics Express*, vol. 13, No. 1, pp. 236-244, Optical Society of America (Jan. 10, 2005).

F. Benabid, G. Bouwmans, J. C. Knight, P. St. J. Russell and F. Couny, "Ultrahigh Efficiency Laser Wavelength Conversion in a Gas-Filled Hollow Core Photonic Crystal Fiber by Pure Stimulated Rotational Raman Scattering in Molecular Hydrogen," *Physical Review Letters*, vol. 93, No. 12, pp. 1-4, The American Physical Society (Sep. 17, 2004).

P. Russell, "Photonic Crystal Fibers," *Science*, vol. 229, pp. 358-362 (Jan. 17, 2003).

W. J. Wadsworth, N. Joly, J. C. Knight, T. A. Birks, F. Biancalana, and P. St. J. Russell, "Supercontinuum and four-wave mixing with Q-switched pulses in endlessly single-mode photonic crystal fibres," *Optics Express*, vol. 12, No. 2, pp. 299-309, Optical Society of America (Jan. 26, 2004).

T. A. Birks, P. J. Roberts, P. St. J. Russell, D. M. Atkin and T. J. Shepherd, "Full 2-D photonic bandgaps in silica/air structures," *Electronics Letters*, vol. 31, No. 22, pp. 1941-1943 (Oct. 26, 1995).

* cited by examiner

*Primary Examiner*—Alessandro Amari
(74) *Attorney, Agent, or Firm*—James M. Skorich

(57) ABSTRACT

A plurality of optically isotropic, parallel dielectric plates of uniform thickness, mutually separated by gaps having a uniform width. The plates are connected by spacers located in the gaps. The gaps are either filled with a gas or evacuated. The plate thickness is on the order of one-half of the wavelength of incident radiation traveling within the medium filling the gaps. Each plate is composed of a transparent material characterized by its index of refraction. The stack of plates should include at least fifteen plates. This abstract is provided to comply with the rules requiring an abstract, and is intended to allow a searcher or other reader to quickly ascertain the subject matter of the technical disclosure. It is submitted with the understanding that it will not be used to interpret or limit the scope or meaning of the claims. 37 CFR §1.72(b).

20 Claims, 2 Drawing Sheets

APPARATUS FOR REFLECTING HIGH-INTENSITY ELECTROMAGNETIC RADIATION

RIGHTS OF THE GOVERNMENT

The invention described herein may be manufactured and used by or for the Government of the United States for all governmental purposes without the payment of any royalty.

BACKGROUND OF THE INVENTION

This invention relates to the field of electromagnetic radiation and, more particularly, to using a plurality of parallel, uniformly spaced dielectric plates to reflect and conceivably guide high-intensity, monochromatic electromagnetic radiation of any wavelength.

Reflectors of electromagnetic radiation are conventionally made of metals or dielectric materials. Metal reflectors may have reflection efficiencies as high as 98%, but their efficiency is limited by possessing a finite electrical conductivity. High intensity incident radiation (measured in watts per unit area) is partially absorbed by generating an electric current in a thin layer at the surface of the metal, which, in turn, dissipates by generating heat. Such heating causes thermal expansion of the metal medium, as manifested by surface bulges, with consequent distortion of the reflected beam. Another limitation inherent to metal reflectors is that their reflectivity is highly wavelength dependent. Thus, any given metal reflector is most efficient over a fixed wavelength band and its efficiency is substantially lower outside of this band.

The surface of a dielectric material lying adjacent to air, or the interface between two abutting different dielectrics, may also reflect electromagnetic radiation. However, much of the incident radiation is transmitted through this surface or interface unless the reflection mechanism is by total internal reflection ("TIR"). TIR occurs when the incident medium has a higher refractive index that that of the transmitting beam, and the angle subtended by the incident radiation and the normal to the surface is larger than the arcsine function of the ratio of the refractive index of the transmitting medium to the refractive index of the incident medium. This principle explains the efficient transmission of light by optical fibers. TIR cannot occur if the incident medium has a refractive index less than that of the dielectric, as is generally the case when the former is air.

According to a third technology, the deposition on a solid substrate material of multiple layers of different materials having properly chosen refractive indexes and thicknesses can result in, roughly speaking, the realization of a phase relationship, i.e., interference, among reflections from consecutive layers, such that a broad range of transmission and reflection properties may be engineered. For example, such a device could be designed to reflect or transmit only frequencies below or above a certain value, or only within a narrow band (referred to as low-pass, high-pass or band-pass filters, respectively). However, this technology is ill-suited for high-intensity radiation because the radiation field not only penetrates deeply within the layered structure, but, due to multiple internal reflections, tends to build-up field intensities within some of the layers that may be even higher than that of the incident beam. Moreover, as metallic films, which have Ohmic loss, are commonly used with dielectric films in this technology, serious thermal problems are encountered even with moderately intense incident radiation.

There is a need in the art for reflecting high-intensity electromagnetic radiation with high efficiency, without creating high radiation intensity within the medium of the reflective apparatus. This invention addresses the foregoing need in the art.

SUMMARY OF THE INVENTION

The invention is comprised of a plurality of optically isotropic, transparent, parallel dielectric plates of uniform thickness, mutually separated by narrow air gaps of uniform width. The transverse dimensions, which are the measures of the width and height of each plate, are not of essential importance to the invention, but rather are determined by its application. The plates are held in place by spacers that are located in the air gaps between consecutive plates. The spacers are placed near the edges of the device, with none near the middle, nor any place where they might be exposed to the radiation, thus blocking it. Alternatively, the plates could be held in place by a slotted frame.

The optimum thickness of each plate is a function of the index of refraction of the dielectric material, the index of refraction of air, and the width of each air gap. For optimal performance, the number of plates has been empirically determined to be at least fifteen.

The invention will reflect nearly 100% of the incident electromagnetic radiation for glancing angles ranging from 0° to a maximum of approximately 18° relative to the surface of the foremost, or primary, plate. In addition, the incident radiation will penetrate only the first few air gaps closest to the primary plate, while the radiation intensity in the plates remains at a small fraction of the incident radiation and the radiation intensity in the gaps.

Other aspects and advantages of the present invention will become apparent from the following detailed description, taken in conjunction with the accompanying drawings, and illustrating by way of example the principles of the invention.

DETAILED DESCRIPTION

The invention is comprised of a layered structure with a significant difference in the refractive index (denoted by n) between neighboring layers. This difference in n is achieved by separating electrically non-conducting, i.e., dielectric, plates or films (for which n can be as large as two or three) by a vacuum (for which n=1) or a rarefied gas such as air (for which n≈1.00027 at the wavelength of 1 micrometer). The present invention possesses the properties of a photonic band-gap medium, in which no extended propagation is possible in certain directions and frequency ranges, known as "forbidden bands."

Figure 1:
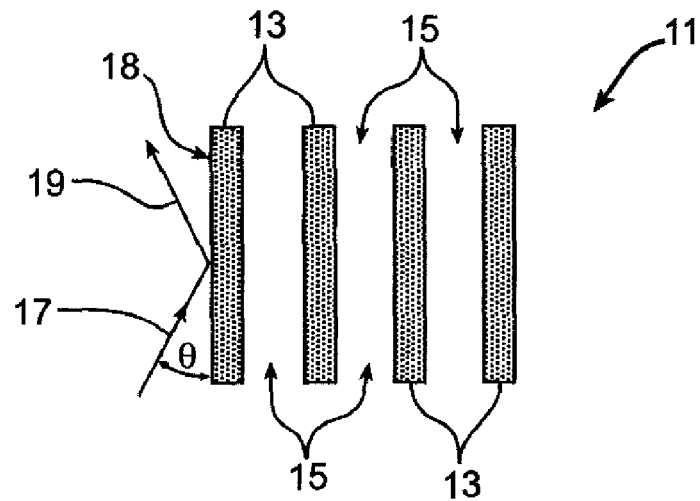
FIG. 1 is a schematic illustration of an apparatus of the present invention having four dielectric plates.

Turning to the drawings, FIG. 1 illustrates apparatus 11 of the present invention comprised of a plurality of optically isotropic, parallel dielectric plates 13 of uniform thickness, mutually separated by gaps 15. Plates 13 could also be fabricated from electrically non-conductive material. Although shown and designated as plates, plates 13 could, alternatively, be comprised of a plurality of dielectric or electrically non-conductive films.

Gaps 15 contain air. However, in the alternative, gaps 15 could be filled with any other rarefied gas, or even be evacuated. In such cases, extra measures would need to be implemented to contain the gas or maintain the vacuum. The transverse dimensions, which are the measures of the width and height of each plate 13, are not of essential importance to the functioning of apparatus 11, but are determined by its application. The transverse dimensions could range from micrometers to centimeters in magnitude, or be even larger. The minimum transverse dimension would be determined based upon the application.

Plates 13 are held in place by spacers (not shown) located in gaps 15. The spacers are placed near the edges of plates 13. Alternatively, plates 13 could be held in place by a slotted frame. θ is the angle of incidence subtended between a ray of incident radiation 17 and the plane of incident surface 18 of the primary plate 13. Also shown is reflected radiation 19.

Apparatus 11 is to be configured in accordance with the following empirically determined equations:

$$t_p n_p^2 = n_a \lambda_a / 2 \text{ for plates 13} \quad (1)$$

and $$w_g n_a = \lambda_a \text{ for gaps 15;} \quad (2)$$

where:
$t_p$=the thickness of each plate 13;
$n_p$=the index of refraction for each plate 13;
$n_a$=the index of refraction for air;
$\lambda_a$=the wavelength of incident radiation 17 in air; and
$w_g$=the width of each gap 15.

Apparatus 11 is capable of reflecting incident radiation 17 of a specified wavelength $\lambda_a$, e.g., a monochromatic laser beam. The value of $\lambda_a$ can lie anywhere from the ultraviolet part of the spectrum to microwave wavelengths. A longer wavelength has the advantage that a structure embodying the present invention will be of larger scale, and thus be sturdier and easier to fabricate.

The numerical value of the refractive index $n_p$ is not critical; for example, $n_p$ could be less than or equal to that of silicate glass (which is about 1.5), but it is preferable to choose a plate material with higher index for applications for which it is desired to have a wide range of θ over which the reflectivity would be large, while for applications requiring the opposite, $n_p$ should be relatively small. As an approximation, to attain high efficiency, apparatus 11 should include at least fifteen of plates 13.

If apparatus 11 were to include an infinite number of plates 13 and stretch across an infinite length, incident radiation would be reflected with 100% efficiency (provided the dielectric material comprising plates 13 is perfectly transparent at the frequency of the incident radiation). Thus, for apparatus 11 having a finite number N of plates 13, the reflection efficiency can approach 100%, or as close thereto as desired, by increasing N. More importantly, the radiation intensity inside any of plates 13 would decrease and approach a trace level as the reflection efficiency approached 100%. Hence, the structure of the apparatus would efficiently reflect incident electromagnetic radiation 17 without causing thermally-induced distortion of reflected radiation 19.

Figure 2:
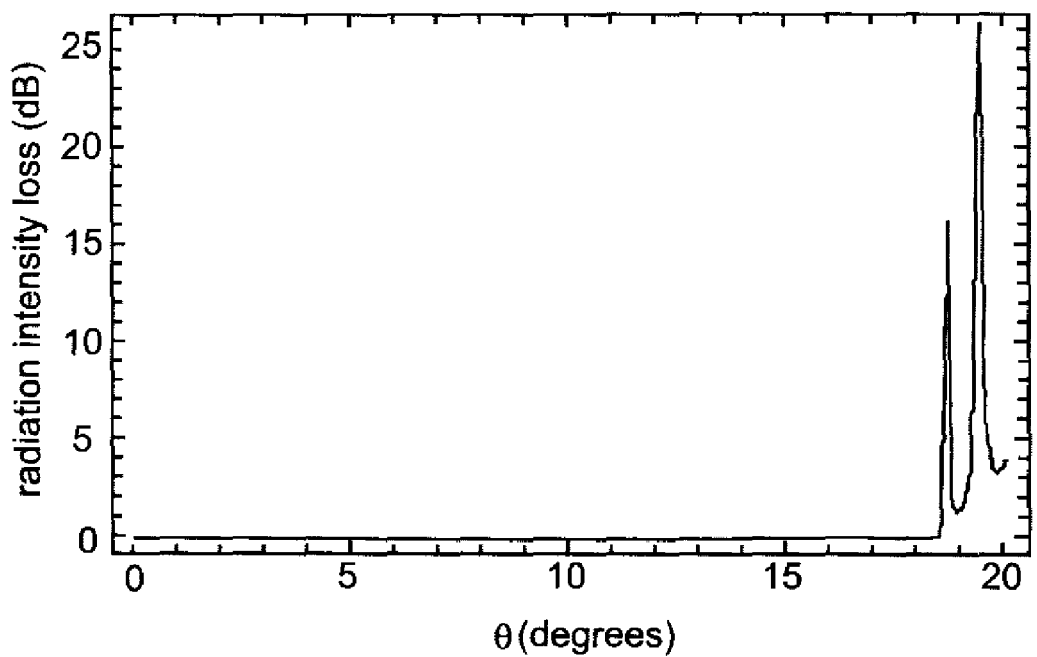
FIG. 2 is a graph of the loss in decibels for the reflection of electromagnetic radiation incident upon a 16-plate apparatus of the present invention, plotted as a function of the angle of incidence of the radiation as defined in FIG. 1.

FIG. 2 is a graph showing the theoretically calculated loss of radiation intensity in decibels plotted as a function of θ, the angle of incident radiation 17, for apparatus 11 reconfigured to include sixteen of plates 13. The graph was made for the case of polarization (electric field direction) perpendicular to the page of FIG. 1. The loss in decibels is defined as ten times the difference between the logarithm to base 10 of the intensity of incident radiation 17 and the logarithm to base 10 of the intensity of reflected radiation 19. The graph illustrates that if apparatus 11 is constructed in accordance with equations (1) and (2), and includes sixteen dielectric plates 13, it will reflect nearly 100% of incident radiation 17 where the incidence angle θ lies within the range of 0° up to and including approximately 18° degrees.

Figure 3:
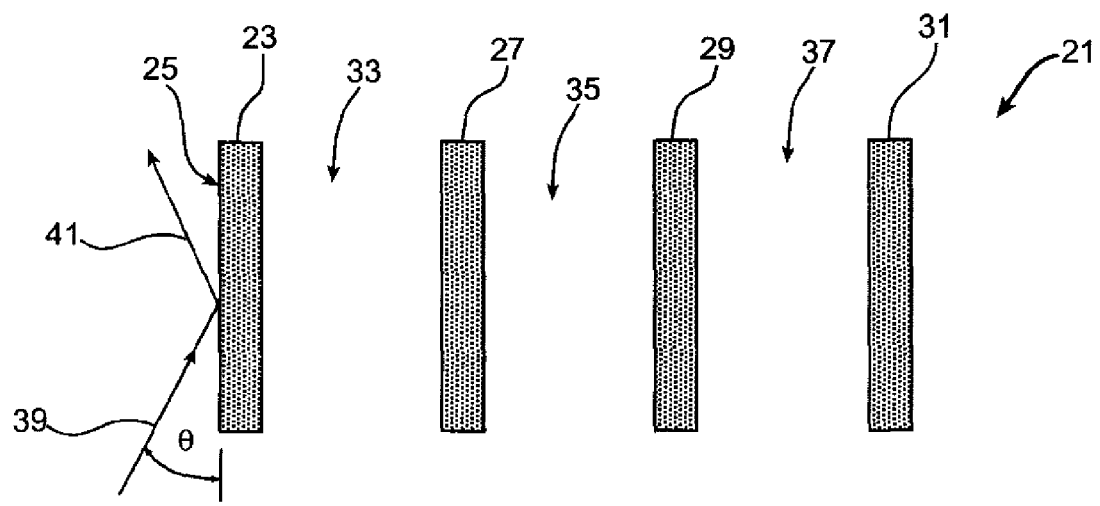
FIG. 3 is a schematic illustration of an apparatus of the present invention juxtaposed with a graph of the intensity of the electromagnetic radiation penetrating the apparatus, measured as a function of the linear distance from the primary plate of the apparatus, for incident radiation subtending an angle of 3.6° with the primary plate of the apparatus.
Figure 3:
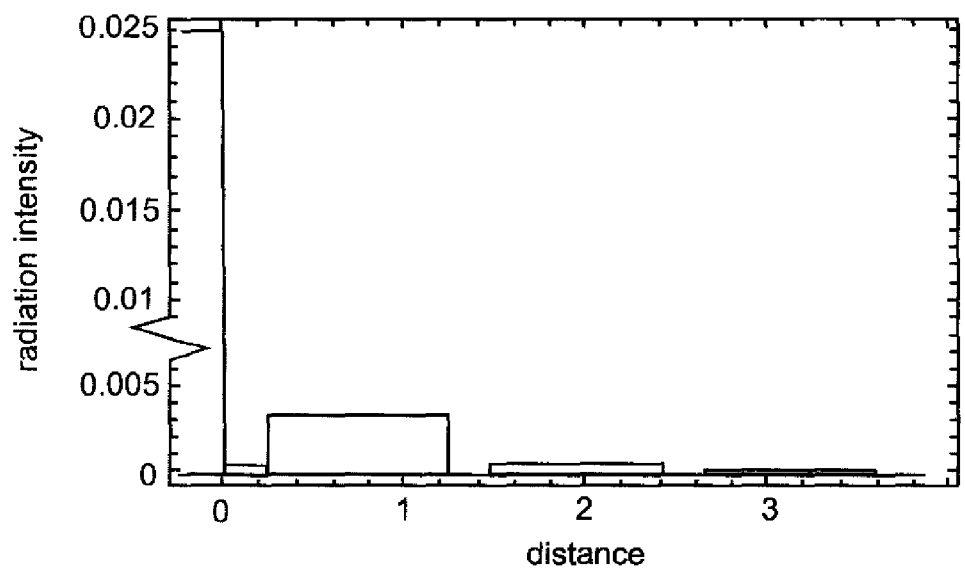

FIG. 3 shows apparatus 21 of the present invention including primary dielectric plate 23 having incident surface 25, and parallel dielectric plates 27, 29 and 31. Plates 23 and 27 are separated by gap 33, plates 27 and 29 are separated by gap 35, and plates 29 and 31 are separated by gap 37. Apparatus 21 includes a total of sixteen dielectric plates, with the remainder of the plates and gaps not being shown. The plates are composed of dielectric material of equal thickness, the gaps are of equal width and contain air, and incident radiation 39 is passing through air. Also shown is reflected radiation 41. For FIG. 3, θ=3.6°. Apparatus 21 was mathematically modeled using equations (1) and (2).

Juxtaposed with apparatus 21 is a graph showing, on its ordinate, the field intensity of incident radiation 39 that would penetrate primary plate 23. The abscissa shows the linear distance from incident surface 25. The field intensity of incident radiation 39 is shown to the left of the zero distance mark on the abscissa.

The graph of FIG. 3 shows that incident radiation 39 will penetrate only the first few air gaps closest to primary plate 23, while the intensity of the radiation in the plates is a small fraction of that in the gaps. More particularly, the penetration of incident radiation 39 into primary plate 23 is extremely small, approximately 0.15% of the intensity of incident radiation 39. The radiation penetration values shown in the graph of FIG. 3 could be further reduced by increasing the number of plates or by increasing the refractive index, n, of the plates.

Since the radiation will have only minimal contact with any medium, reflecting surfaces constructed in this manner can be used for reflectors of ultra-high intensity monochromatic beams or pulses of radiation in laser resonators, or to direct or steer laser beams. Another application would be to fabricate a high-efficiency, optical diffraction grating upon the incident surface of the primary plate, i.e., surface 18 of apparatus 11 or surface 25 of plate 23 of apparatus 21. The diffraction grating would necessarily be capable of withstanding extremely intense electromagnetic radiation without suffering significant thermal distortion.

The illustrated embodiment shows the plates in a stacked or layered configuration. In an alternative embodiment of the invention, the plates would instead be concentric cylinders, with the gap being the radial spacing between them. This configuration would lend itself for use as a cylindrical waveguide for a high-intensity laser beam.

It is to be understood that the preceding is merely a detailed description of several embodiments of this invention and that numerous changes to the disclosed embodiments may be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. An apparatus for reflecting electromagnetic radiation, comprising:
a plate having two planar transverse faces, having a thickness between the two faces, being composed of an optically isotropic, electrically non-conductive material, and having a plate index of refraction;
a plurality of the plates;
the faces for all of the plates lying in parallel;
the plates being spaced apart from each other by a plurality of gaps, respectively;
the gaps having a uniform width;
the gaps being filled with a medium having a medium index of refraction;
incident radiation having a wavelength within the medium; and
the thickness, the plate index of refraction, the width of the gaps, the medium index of refraction, and the wavelength having the following quantitative relationships:

$$t_p n_p^2 = n_m \lambda_m/2 \text{ and}$$

$$w_g n_m = \lambda_m$$

where: $t_p$=the thickness the plate;
$n_p$=the plate index of refraction;
$n_n$=the medium index of refraction;
$\lambda_m$=the wavelength of the incident radiation within the medium; and
$w_g$=the width of the gaps.

2. A radiation reflecting apparatus as defined in claim 1 wherein the plurality of the plates is at least fifteen of the plates.

3. A radiation reflecting apparatus as defined claim 2 wherein:
the plates include a primary plate that lies adjacent to only one of the other plates; and
the primary plate includes an exterior surface for being impinged by incident radiation; further comprising
an angle of incidence for incident radiation being subtended by the exterior surface and a ray of incident radiation; and
the angle of incidence having a maximum value of approximately 18°.

4. A radiation reflecting apparatus as defined in claim 2 wherein the plurality of the plates is at least fifteen of the plates.

5. A radiation reflecting apparatus as defined in claim 1 wherein the material is a dielectric material.

6. A radiation reflecting apparatus as defined in claim 1 wherein the material is transparent for a predetermined range of electromagnetic radiation wavelengths.

7. A radiation reflecting apparatus as defined claim 1 wherein:
the plates include a primary plate that lies adjacent to only one of the other plates; and
the primary plate includes an exterior surface for being impinged by incident radiation; further comprising
an angle of incidence for incident radiation being subtended by the exterior surface and a ray of incident radiation; and
the angle of incidence having a maximum value of approximately 18°.

8. A radiation reflecting apparatus as defined in claim 1 wherein the medium is a gas.

9. A radiation reflecting apparatus as defined in claim 8 wherein the gas is air.

10. A radiation reflecting apparatus as defined in claim 1 wherein the medium is a vacuum.

11. A radiation reflecting apparatus as defined in claim 1 wherein:
each plate has a lateral perimeter; and further comprising
a spacer being located in each of the gaps for attaching to the plates lying adjacent to the gap in which the spacer is located, at the lateral perimeters.

12. A radiation reflecting apparatus as defined in claim 1 wherein:
the plates have peripheral edges; and further comprising
a frame having slots for engaging the edges, respectively, whereby
the plates are connected by inserting the edges into the slots.

13. A radiation reflecting apparatus as defined in claim 1 wherein each of the plates is comprised of a film.

14. A radiation reflecting apparatus as defined in claim 1 wherein:
the plates include a primary plate that lies adjacent to only one of the other plates; and
the primary plate includes an exterior surface for being impinged by incident radiation; further comprising
an optical diffraction grating being attached to the exterior surface.

15. A radiation reflecting apparatus as defined in claim 14 wherein the plurality of the plates is at least fifteen of the plates.

16. A radiation reflecting apparatus as defined in claim 14 wherein the material is a dielectric material.

17. A radiation reflecting apparatus as defined in claim 14 wherein the medium is a gas.

18. A radiation reflecting apparatus as defined in claim 17 wherein the gas is air.

19. A radiation reflecting apparatus as defined in claim 14 wherein the medium is a vacuum.

20. A radiation reflecting apparatus as defined claim 14 wherein:
the plates include a primary plate that lies adjacent to only one of the other plates; and
the primary plate includes an exterior surface for being impinged by incident radiation; further comprising
an angle of incidence for incident radiation being subtended by the exterior surface and a ray of incident radiation; and
the angle of incidence having a maximum value of approximately 18°.

* * * * *